Figure 1A:
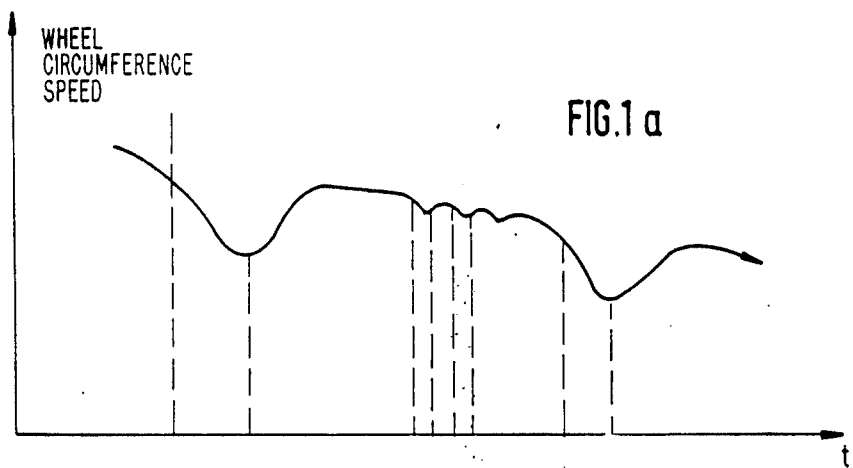

United States Patent [19]

Braschel et al.

[11] Patent Number: 4,938,544
[45] Date of Patent: Jul. 3, 1990

[54] METHOD OF CONTROLLING THE BRAKE PRESSURE IN AN ANTI-LOCK VEHICLE BRAKE SYSTEM

[75] Inventors: Volker Braschel, Neuwied; Josef Pickenhahn, Plaidt, both of Fed. Rep. of Germany

[73] Assignee: Lucas Industries, Birmingham, England

[21] Appl. No.: 313,207

[22] Filed: Feb. 21, 1989

[30] Foreign Application Priority Data

Feb. 19, 1988 [DE] Fed. Rep. of Germany ....... 3805270

[51] Int. Cl.$^5$ .......................... B60T 8/32; B60T 8/66
[52] U.S. Cl. ................................. 303/103; 188/181 C; 303/97; 303/105; 364/426.02
[58] Field of Search .................... 303/95, 97, 100, 103, 303/104, 105, 106, 109, 110, 107; 188/181 A, 181 C; 364/426.01, 426.02

[56] References Cited

U.S. PATENT DOCUMENTS

| | | | |
|---|---|---|---|
| 3,554,612 | 1/1971 | Harned | 303/107 |
| 3,724,903 | 4/1973 | Okamoto et al. | 303/109 |
| 4,193,642 | 3/1980 | Miller | 303/97 |
| 4,384,330 | 5/1983 | Matsuda et al. | 303/97 X |
| 4,530,059 | 7/1985 | Brearley et al. | 303/97 X |
| 4,635,031 | 1/1987 | Blomberg et al. | 303/96 X |
| 4,673,226 | 6/1987 | Every et al. | 303/97 X |
| 4,701,855 | 10/1987 | Fennel | 303/105 X |
| 4,797,825 | 1/1989 | Shimanuki et al. | 364/426.02 |
| 4,807,133 | 2/1989 | Shimanuki et al. | 303/105 X |
| 4,825,371 | 4/1989 | Hoashi et al. | 364/426.02 |

FOREIGN PATENT DOCUMENTS

| | | |
|---|---|---|
| 2251785 | 4/1973 | Fed. Rep. of Germany . |
| 1942369 | 12/1975 | Fed. Rep. of Germany . |
| 2460904 | 7/1976 | Fed. Rep. of Germany . |
| 3345729 | 6/1985 | Fed. Rep. of Germany . |
| 3430098 | 2/1986 | Fed. Rep. of Germany ...... 303/109 |
| 0006544 | 9/1988 | PCT Int'l Appl. ................. 303/109 |

OTHER PUBLICATIONS

"Bosch Technische Berichte", (English Special Edition), Bosch, 2-1982.
"ATZ Automobiltechnische Zeitschrift", 74 (1972) 7, pp. 277-282.

Primary Examiner—Douglas C. Butler
Attorney, Agent, or Firm—Scrivener and Clarke

[57] ABSTRACT

In an anti-lock vehicle braking system the brake pressure acting at the controlled wheel is controlled in such a manner that the threshold value with respect to the rotational retardation of the wheel at the beginning of a lowering or raising of pressure is increased briefly, during a control cycle, by a constant amount ($S_H - S_G$) with respect to a threshold base value ($S_G$) in order to avoid any undesired control operations caused especially by axle vibrations, pot holes, and the like. The threshold value is then decreased in response to the period of time of the pressure reduction in the preceding control cycle. The decreasing of the threshold value is carried on to values $S_T$ below the threshold base value and maintained for a given time interval ($t_x - t_y$).

11 Claims, 6 Drawing Sheets

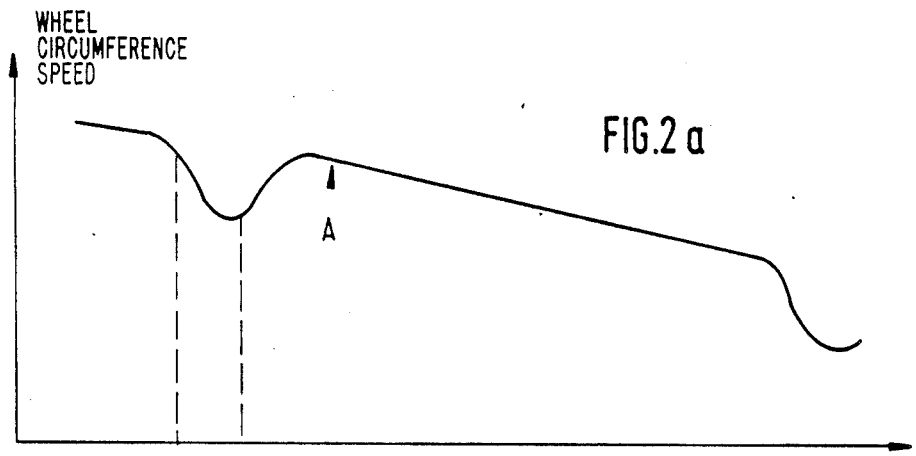
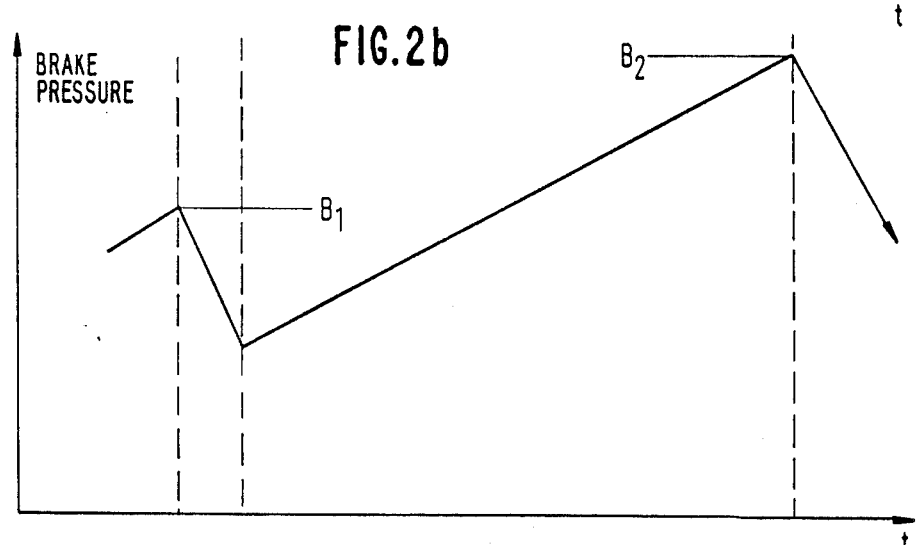
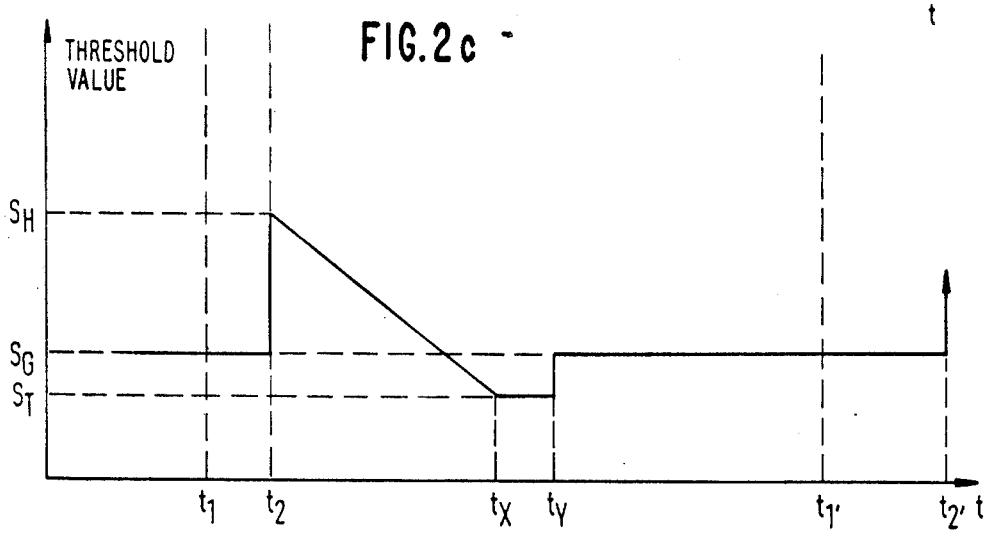

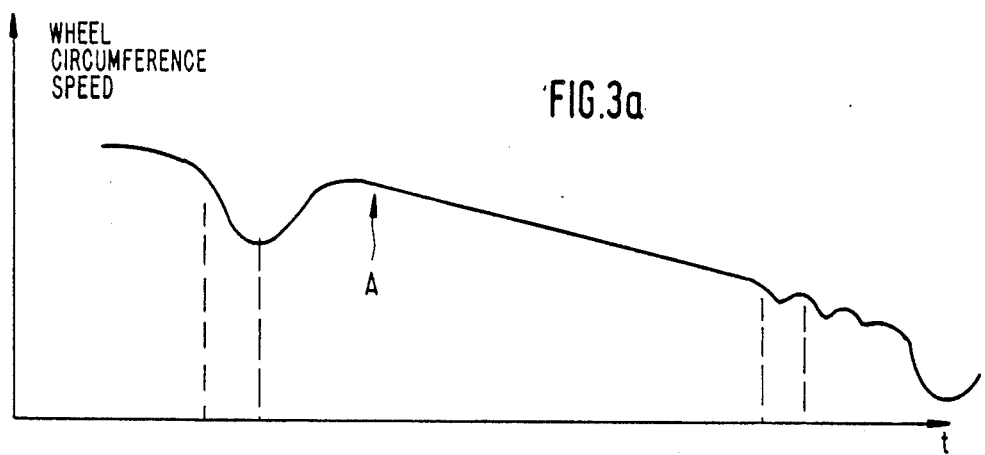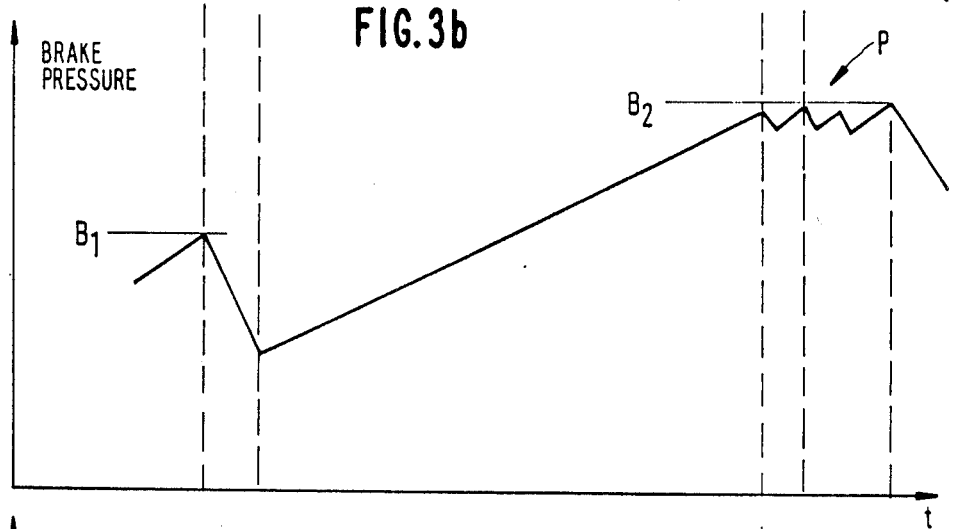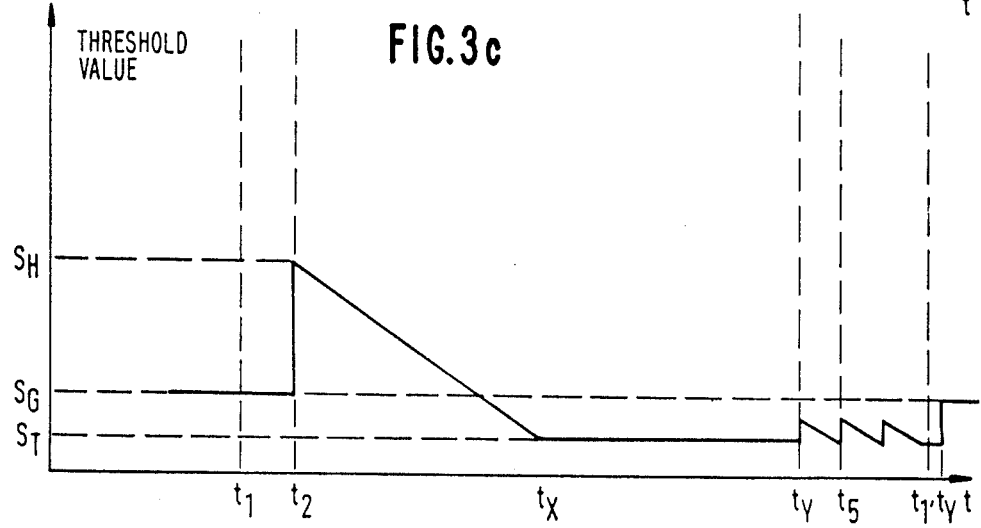

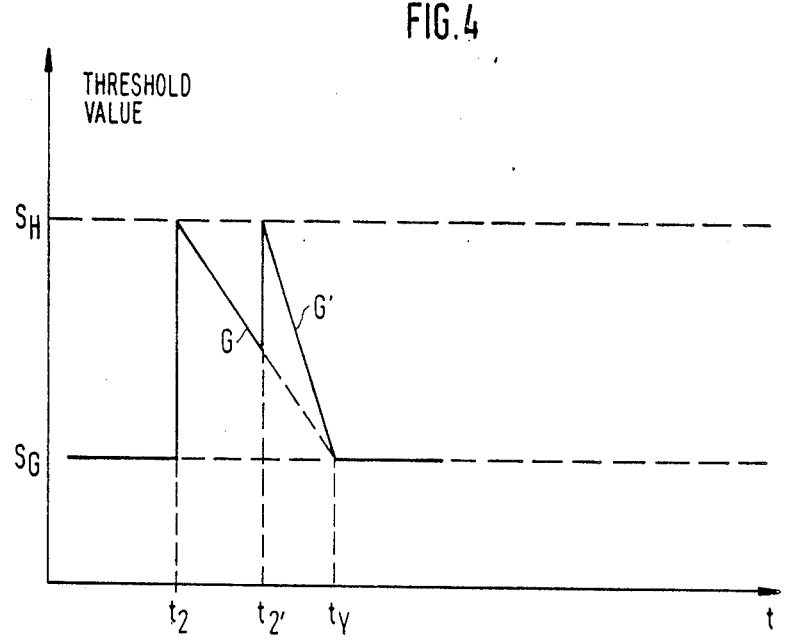

METHOD OF CONTROLLING THE BRAKE PRESSURE IN AN ANTI-LOCK VEHICLE BRAKE SYSTEM

The invention relates to a method of controlling the brake pressure in an anti-lock vehicle brake system, wherein the rotational behavior of a braked wheel is measured and the brake pressure is lowered in response to the slip and/or retardation of the wheel upon surpassing of a threshold value, and later on raised again, and wherein the threshold value is increased with respect to a threshold base value ($S_G$) and subsequently decreased in response to time in order to avoid any undesired exceeding of the threshold value caused, in particular, by axle vibrations and the like.

In the case of vehicle brakes furnished with an anti-lock system the rotation of the individual wheels of the vehicle is monitored constantly and particularly the slip of the braked wheels and their retardation are determined in order to detect a tendency of the wheel to become locked and prevent such locking. The further rise of pressure in the brake of the wheel concerned is terminated or the brake pressure reduced as soon as the wheel slip or retardation indicate a locking tendency, a circumstance which is ascertained by the fact that certain predetermined threshold values relating to slip and/or retardation are surpassed.

The pressure in the brake is increased once more as soon as the wheel concerned has experienced sufficient rotary acceleration by virtue of its friction with the road surface in order to achieve further braking effect with this particular wheel.

The question with the anti-lock brake pressure control mainly is to have the wheels at which brakes are applied run in the most favorable range of the known friction coefficient/slip curve during all the control cycles of a braking action.

The anti-lock system should be able to react most sensitively and without delay to any signs in the rotational behavior of the braked wheel indicating a tendency of the wheel to become locked in order that braking at the shortest possible stopping distance can be achieved while the vehicle remains steerable. To accomplish that, it would be desirable to adjust the threshold values mentioned as sensitively as possible, in other words such that a control cycle involving a reduction of the brake pressure is initiated even when the changes of the rotational behavior of the wheel towards a tendency to become locked still are relatively small.

Such sensitive adjustment of the threshold values, however, is opposed by the fact that under certain conditions, which are not unlikely, wheels subjected to braking may display a rotational behavior indicating strong rotational retardation although the wheel still is running in a condition which permits good braking. This phenomenon is well-known and described in detail, for instance, in the patent to Fenner No. 4,701,855, which corresponds to DE 3,345,729. Particularly axle vibrations may cause relatively great differences between the speeds of the vehicle and of the wheel and these differences feign unstable running of the wheel and, therefore, may release undesired control operations, i.e. an undesired reduction of the brake pressure. If the wheel at which the brake is applied hits a pot hole or moves across an uneven road surface, furthermore, at first there may be a jerky rotational acceleration followed by a strong retardation.

As a consequence of such axle vibrations and the like any narrowly adjusted threshold values with respect to the rotational retardation of the wheel may be exceeded and an undesired control operation may be initiated (pressure reduction in the braked wheel) although there is no risk that this wheel will become locked.

The Fenner patent which defines the generic kind of method in question provides for suppression of undesired control operations by varying the threshold value which is decisive for the initiation of control in response to the starting acceleration of the controlled wheel. To accomplish that, the starting acceleration of the braked wheel (in other words the renewed beginning of rotation of the wheel after a retardation) is being monitored continuously and the decisive threshold value for release of a control process, i.e. for pressure reduction in the brake of the wheel is varied when the starting acceleration surpasses a given limit value. The threshold value is varied in response to the extent of the starting acceleration. This means that the threshold value is increased momentarily to the value resulting from the starting acceleration, whereupon it dies down again to the base value at a given time function (exponentially or linearly). The threshold base value is that threshold value normally adopted by the system, in other words, whenever the starting acceleration of the wheel lies below the limit value mentioned above or when no control is made.

Another important aspect with an anti-lock system in addition to the closest possible adjustment of the threshold values, i.e. the most sensitive control possible of the brake pressure beginning early on, is the best possible suppression of the so-called brake hysteresis. The phenomenon of the brake hysteresis has been described, for example, in the journal ATZ (Automobiltechnische Zeitschrift) 74, 1972, no. 7, pages 277 to 282 (paper by Fritzsche and Reinecke) and in DE-PS 24 60 904. Brake hysteresis is understood as being the property of the brake system according to which the brake moment active at the moment is not directly an unambiguous function of the brake pressure prevailing at the moment but instead follows the brake pressure with a certain delay in time. Thus, if there is a changeover from pressure rise to pressure drop and vice versa, first of all, a range is passed because of the hysteresis in which range the brake moment remains almost constant initially in spite of the pressure variation. This results in a disturbing idle time not utilized for the control. Moreover, steep gradients of pressure drop and pressure rise cause a so-called "overshooting" of the pressure above the ideal limit values because of the general inertia of the system. DE-PS 24 60 904 provides for the pressure rise and the pressure drop to be controlled with different gradients in order not only to avoid the harmful effect of the hysteresis but also to obtain optimum adaptation of the course of the wheel circumference speed to the favorable range of the friction coefficient/slip curve. At the beginning of a pressure rise or pressure drop a quick change of the pressure is effected by applying a relatively great gradient, while the pressure variation is effected at smaller gradients when the limit value to be reached is being approached. The duration of the pressure change at great gradients depends on the duration previously determined of the raising of the pressure in the preceeding control cycle.

It is an object of the invention to devise the method mentioned initially for control of the brake pressure in an anti-lock vehicle brake system such that any undesired exceeding of threshold values caused in particular by axle vibrations and the like is excluded by simple means and yet the course in time of the brake pressure permits the shortest possible stopping distance even at irregular road conditions.

This object is met, in accordance with the invention, in that the threshold value is increased by a given constant amount with respect to the threshold base value in response to the time of the beginning of a lowering or raising of pressure in a control cycle.

The invention thus is based on the finding that an increase of the threshold value by a given constant amount will provide good results.

Another solution of the problem posed provides for the threshold value to be increased by an amount which depends on a previously measured vehicle deceleration in response to the time of the beginning of a lowering or raising of pressure in a control cycle.

In accordance with another variant of the invention, the threshold value is increased with respect to the threshold base value by an amount which depends on the pressure reduction time interval in at least one control cycle, preferably the directly preceding control cycle, depending on the time of the beginning of a lowering or raising of pressure in a control cycle.

It is provided, in a prefered modification of the invention, that the decreasing of the threshold value in response to time, in other words the reduction of the threshold value from the higher value, which was increased by the constant amount, in the direction back to the basic value is effected by utilizing a gradient which depends on the time interval or duration applied for the pressure reduction in one or more previous control cycles, preferably the directly preceding control cycle. While the teaching of the Fenner patent still provided for predetermining a function decaying in time for the threshold value (e.g. exponentially or linearly) the decreasing of the threshold value according to the modification of the invention is made dependent on how much time was needed during the preceding control cycle for the wheel which ran the risk of becoming locked to experience a certain rotational acceleration, in other words how long the time interval or duration of the pressure reduction was in the preceding control cycle. This duration of the pressure reduction corresponds to the time interval during which the pressure release valve is opened.

The time interval provided for the decay of the threshold value which, at first, had been increased may be made dependent also on the rotational behavior of the wheel during the preceding control operations. To this end the control frequency, i.e. the number of control cycles per unit time is determined and memorized in a processor. The control frequency thus determined is used for calculating when the next pressure reduction signal is to be expected, provided the road surface is homogeneous, i.e. remains unchanged. At this point in time the threshold value again should be the same as the threshold base value.

Another prefered modification of the method according to the invention provides for modifying the decay of the threshold value from the less sensitive increased value to the normal base value. It is obvious that the rotational behavior of the wheel continues to be monitored permanently also during the decaying of the threshold value from the increased value down to the threshold base value. If the wheel reaches the normal threshold base value during such a phase of decay, a circumstance which in this instant does not cause any response of the pressure control (pressure reduction) because the threshold value which happens to be adjusted at this instant still is higher than the threshold base value, another increase of the threshold value is initiated ("triggered") in accordance with this modification of the invention. Following such renewed triggering of the increased threshold value the subsequent decaying gradient, i.e. the steepness at which the increased threshold value is lowered to the threshold base value, may be adjusted to be steeper than during the first decay from the increased threshold value during this control cycle.

The invention is based on the assumption that the closing of the pressure release valve is followed in conventional manner by a pressure build-up. This pressure build-up occurs at a given gradient and the gradient is controlled in per se known manner by a throttle, a flow rate governor, or by pulsed clocking of the pressure inlet valve.

Specifically, the threshold value is decreased at a gradient which depends on the time interval of the pressure reduction in the preceding control cycle in such manner that a steeper gradient is selected in case of a short pressure reduction period, while a relatively flat gradient is chosen when the time interval of pressure reduction is long. Preferably, the time of decay of the threshold value is limited to a predetermined value, e.g. to 200 milliseconds in order to avoid that the control in the instantaneous control cycle becomes too insensitive if the pressure reduction periods in the preceding control cycle were unusually long.

In the case of another prefered modification of the method according to the invention it is provided that the decreasing of the threshold value first is effected to values which lie below the threshold base value, i.e. for a certain period of time the threshold value is set at a value below standard so that the control becomes more sensitive than would correspond to the threshold value adjusted before the beginning of a first control cycle. The given period during which the threshold value is decreased below the threshold base value preferably is selected in dependence on the duration of the pressure reduction or the rotational behavior of the wheel in the directly preceding control cycle such that presumably the control system will respond within this time interval, provided the road surface is homogeneous and does not change substantially, i.e. the pressure release valve by which the brake pressure is reduced is opened at least briefly.

In a variant embodiment of the invention the gradient at which the threshold value is diminished from the increased value in the direction of the threshold base value and the lesser threshold value below the same, is adjusted additionally in response to the vehicle deceleration determined.

The term "gradient" in the sense of the above explanations is not limited to a linear function but instead comprises other functional courses as well which may not be monotonous, if desired. Thus it comprises only a statement as to how quickly the decrease of the threshold value is effected on the whole, the decrease following functions which may decay differently in time. Preferably, a linear function is used.

Figure 5:
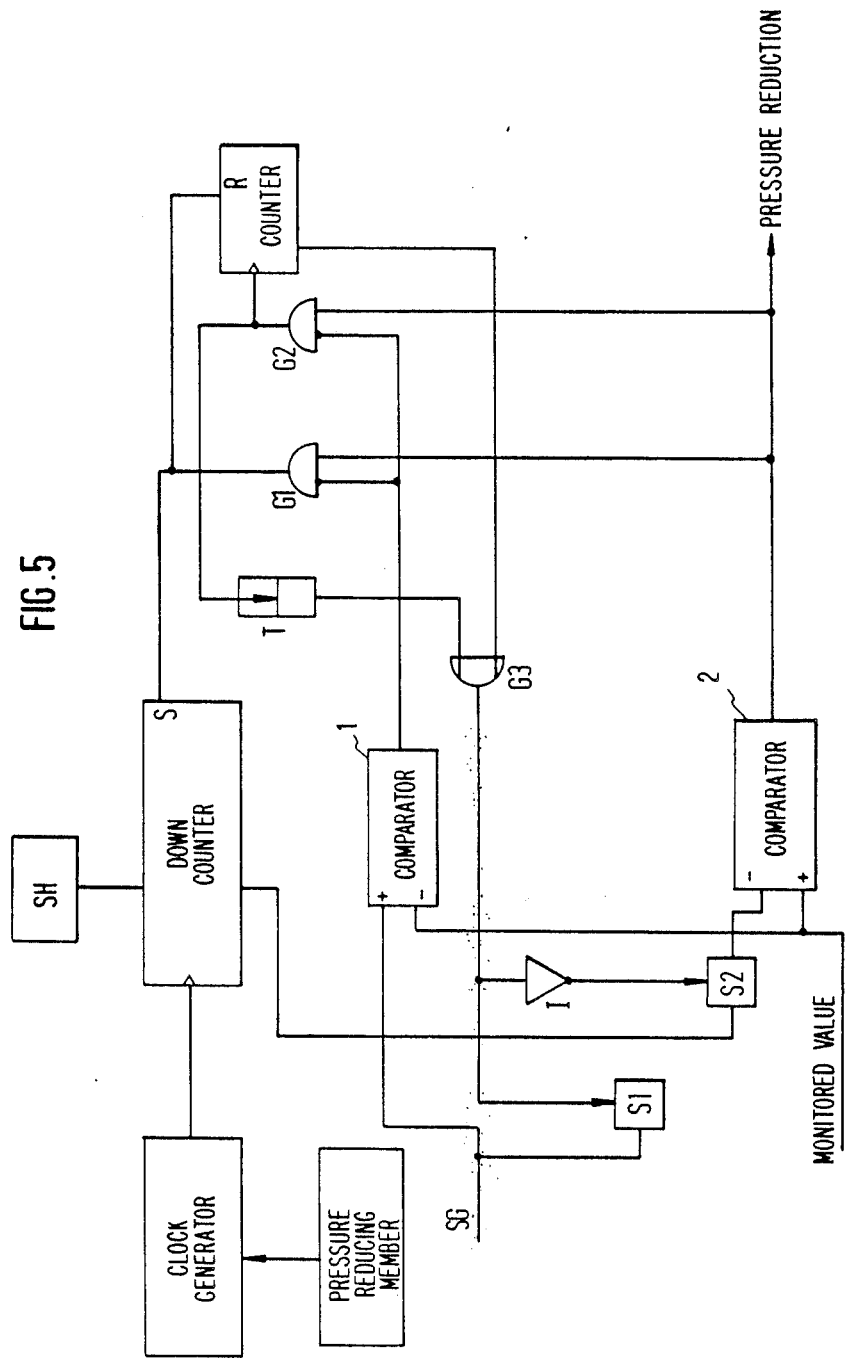

Embodiments of the invention will be described further below with reference to the accompanying drawings, in which:

FIGS. 1a, b, c, d, e, f is a graph showing the course in time of the wheel circumference speed, the brake pressure, and the corresponding threshold value for a first embodiment of control of the brake pressure in accordance with the invention;

FIGS. 2a, b, c and 3a, b, c are graphs similar to FIG. 1 for further embodiments of a control method according to the invention;

FIG. 4 is a graph of the course of the threshold value in accordance with another embodiment of the control method according to the invention; and FIG. 5 is a block diagram of an apparatus for carrying out a control method according to the invention.

Each one of the figures represents a single control cycle in the course of an anti-lock braking operation which typically comprises a plurality of such cycles. In FIGS. a, b, and c the wheel circumference speed and the brake pressure and the threshold value, respectively, are plotted above identical time abscissae.

The circuitry means by which the pressure valves of an anti-lock braking system are controllable in a desired time sequence now a days are well-known to a person skilled in the art (cf. e.g. the publications mentioned initially as well as DE 22 51 785, DE 23 07 368).

Today those skilled in the art likewise are familiar with the means for measuring the rotational behavior of a wheel whose brake is applied and for carrying out the comparison with predetermined threshold values relating to the slip and/or the wheel retardation. For this reason the specification below may focus on the invention proper.

The invention is useful also with so-called anti-slip control (ASR). Anti-slip control already is effected with the state of the art by means of the anti-lock control systems described. Anti-slip control serves to prevent a wheel from spinning upon starting a vehicle, especially on a slippery road surface. Anti-slip control thus warrants that the maximum torque will be transmitted from the tires to the road surface when a vehicle is accelerated.

The driving wheels of a motor vehicle usually comprise a so-called differential gear. The driving power is not transmitted to the wheels on a continuous axle but instead by way of the differential gear which comprises two shafts having the same torque but different rotation rates If a wheel of the vehicle skids, consequently also the other (non-skidding) wheel is driven at a correspondingly lower torque so that the wheels as a whole do not transmit the maximum torque to the road surface. In accordance with the known starting slip control systems, therefore, a likewise known anti-lock brake system is used to monitor also the rotational behavior of the wheels as to any possible slipping. To accomplish that, it is determined whether or not the rotational acceleration of a wheel is greater than a predetermined threshold value which is dependent on the acceleration obtainable by the vehicle on an ideal road surface. As soon as given threshold values regarding the rotational acceleration of the wheel are exceeded, the respective wheel is braked positively and automatically (i.e. without any need for the driver to actuate the brake pedal) so that an increased torque can be produced at the previously skidding wheel as well by way of the differential gear. This anti-slip control, too, is effected with a plurality of control cycles of quick succession, as is known to those skilled in the art.

The methods of the invention are applicable also in the anti-slip control. In that type of control an undesired exceeding of the threshold value may occur as well, particularly as a consequence of axle vibrations and the like. Such occurrences have the undesired result of a pressure build-up automatically taking place too soon at the wheel concerned.

Thus the invention also teaches a method of controlling the brake pressure in a vehicle brake system with anti-slip control where the rotational behavior of a driven wheel is measured and brake pressure is generated in response to the acceleration thereof, and later lowered again. This method is characterized in that the threshold value is increased by a given constant amount $(S_H - S_G)$ with respect to the threshold base value $(S_G)$ at a time $(t_2)$ which depends on the time $(t_1, t_2)$ of the beginning of a lowering or raising of pressure and at least for part of the time interval $(t_2 - t_1')$ during which the brake pressure is raised in a control cycle.

In an anti-slip control operation the change of the threshold value with respect to the threshold base value may be effected also by an amount which depends on a pressure build-up time interval in at least one preceding control cycle, instead of applying the above mentioned anti-slip control which includes increasing the threshold value by a given constant value with respect to the threshold base value.

The embodiments recited in claims 4 to 10 may be transferred in an analogous manner from anti-lock brake control to anti-slip control, i.e. from ABS to ASR.

Figure 1B:
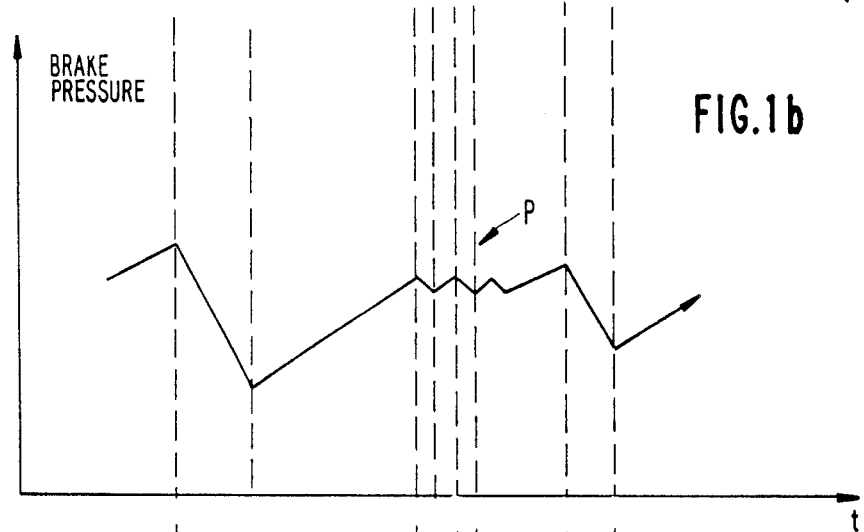
Figure 1C:
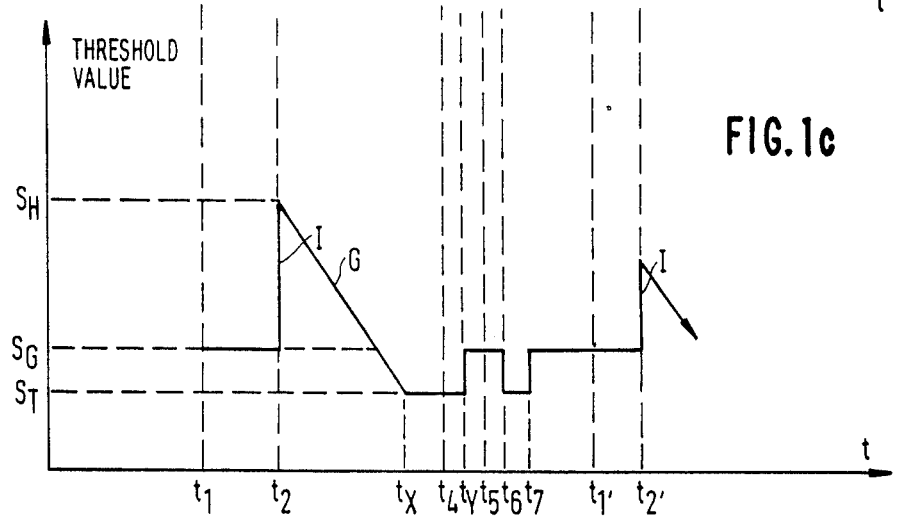
Figure 1D:
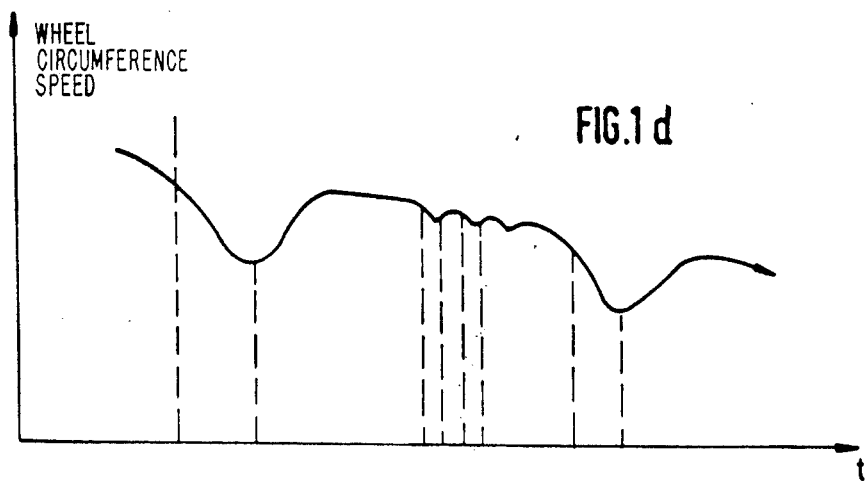
Figure 1E:
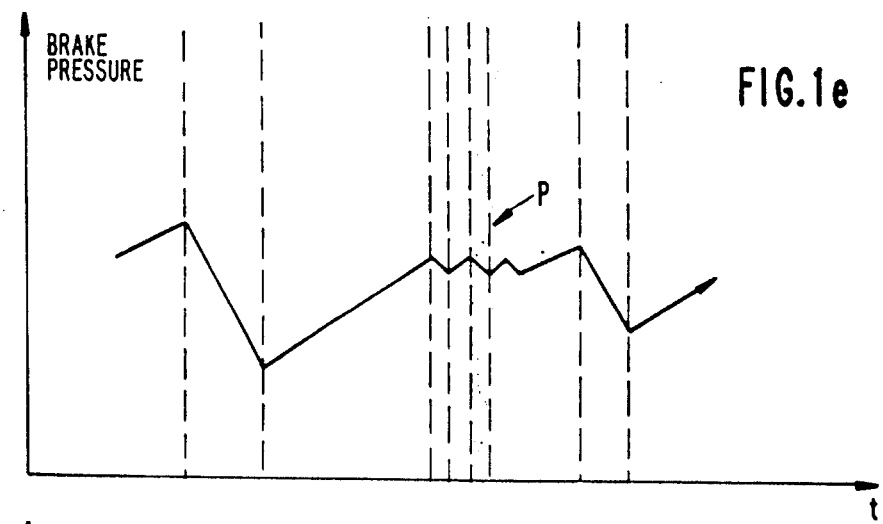
Figure 1F:
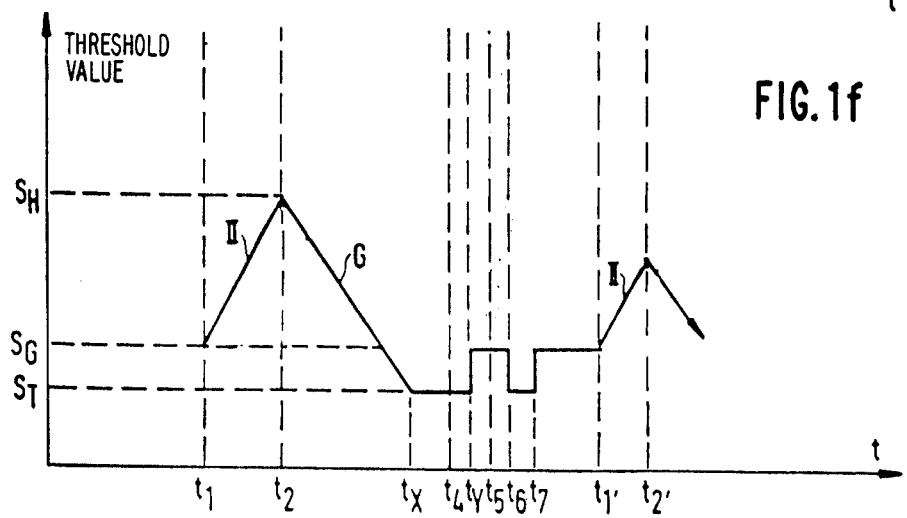

FIGS. 1a and 1b show courses of the wheel circumference speed and brake pressure, respectively, coordinated in time, in one control cycle. A person skilled in the art is aware of the theoretical bases for the establishment and understanding of these curves (cf. e.g. BOSCH Technische Berichte, vol. 7, 1980, no. 2, pages 65 to 94). The invention relates to the control of the threshold value in respect of the rotational retardation of the wheel as represented in FIGS. 1c, 2c, 3c. As soon as the rotational retardation of the braked wheel exceeds the threshold value, a circumstance indicating the tendency of the wheel to become locked, the pressure release valve of the associated brake is opened and the brake pressure reduced so that the wheel will be transferred again from the range of the critical high slip into a stable range in which it is readily steerable and develops a high braking effect.

As shown in FIGS. 1c, 2c, 3c, the threshold value relating to the rotational retardation of the wheel is not constant but instead presents a function of time and is increased or decreased in response to whether there is a drop or rise in brake pressure during the control cycle (FIGS. 1b, 2b, 3b).

In a simple system not designed in accordance with the invention the threshold value would be constant in time. In that case, however, a sensitive adjustment of the threshold value would result in undesired values of rotational retardation occurring if there were any of the above mentioned axle vibrations or the like, and these values might surpass the threshold value and, therefore, cause unnecessary and consequently undesired lowering of the brake pressure at the wheel under control.

To avoid any such undesired exceeding of the threshold value, the threshold value in accordance with FIGS. 1c, 2c, 3c is varied in response to the brake pressure.

Prior to and at the beginning of a control cycle the prevailing value is the threshold base value $S_G$ which also may be called "standard threshold value".

At time $t_1$ the rotational retardation of the braked wheel surpasses the threshold base value $S_G$ and that indicates a tendency of this wheel to become locked. To avoid such locking, the brake pressure then is lowered in accordance with FIG. 1b. The brake pressure is caused to rise again in conventional manner (cf. FIG. 1b; time interval $t_2$ to $t_4$) as soon as the wheel whose brake pressure has been relieved has "fallen in line" again (cf. FIG. 1a).

As shown in FIG. 1c, a first variant of the invention provides for a sharp increase of the threshold value by a constant amount from the threshold base value $S_G$ to the increased threshold value $S_H$ at time $t_2$, i.e. at the time of the beginning of the brake pressure rise (FIG. 1b). This course of the threshold value is shown by a continuous line in FIG. 1c. Therefore, the brake pressure rise according to FIG. 1b cannot be interrupted by rotational retardations of the wheel caused by such events as axle vibrations, pot holes, and the like. It is particularly the time interval which begins at the point in time $t_2$ of a renewed pressure build-up which is particularly susceptible to the occurrence of such error signals so that an increased threshold value is provided for this time period to make any such "faked" rotational retardations ineffective. Following the sudden increase of the threshold value to the higher value $S_H$ at time $t_2$, the threshold value is lowered continuously during the interval from time $t_2$ to $t_x$. This decreasing is effected at a gradient G which is determined by the duration of the pressure reduction ($t_1$ to $t_2$) either in the preceeding control cycle or in the control cycle which is under way. The shorter the time interval of the pressure reduction is, the steeper the gradient G will be.

According to FIG. 1c, the threshold value is decreased during the time interval $t_2$ to $t_x$ not only to the threshold base value $S_G$ but even beyond the same to a lower value $S_T$. At the threshold value $S_T$, therefore, the system displays increased control sensitivity, i.e. the reduction of the brake pressure is carried out at smaller rotational retardations already than the threshold base value $S_G$.

The time interval $t_x$ to $t_y$ during which the threshold value $S_T$ is effective is maintained for a predetermined period of e.g. 16 ms. Subsequently, in other words at time $t_y$, the threshold value again is increased to the "normal" threshold base value $S_G$ if the threshold value has not been exceeded during this time span (of e.g. 16 ms). If the control should respond within the time interval $t_x - t_y$ adjusted, for example, to 16 ms (i.e. if the threshold value should be exceeded), occurring here at time $t_4$, the decreased threshold value $S_T$ is maintained for another given period which likewise may be in the order of from 5 to 20 ms and is increased only then to the threshold base value $S_G$. The duration of the extremely sensitive threshold value $S_T$ is selected such that there is a great likelihood that the rotational retardation of the wheel will indeed surpass the low threshold value $S_T$, provided the road surface is homogeneous, in other words does not change substantially and, therefore, the magnetic valve causing brake pressure relief will be opened and the brake pressure be lowered briefly in accordance with FIG. 1b (time period $t_6$ to $t_7$). Following that, the threshold value relating to the rotational acceleration will be exceeded again after a short time and renewed pressure build-up will take place. What is caused in this manner is a so-called "pulsing of pressure" as indicated in FIG. 1b in the range marked P.

When the threshold value, at time $t_y$, again has been adjusted to the threshold base value $S_G$, the brake pressure once more reaches a maximum value at time $t_1'$ and at this point the rotational retardation of the wheel once more becomes so great that again there is a risk of the wheel becoming locked. A new control cycle will begin in correspondence with the one described above.

In a modification of the embodiment described above, the threshold value is not increased suddenly at the beginning of time $t_2$ of the pressure build-up, as indicated by curve I, from the threshold base value $S_G$ to the increased threshold value $S_H$. Instead, the value is increased continuously before to the higher value $S_H$ at time $t_1$, the beginning of the pressure reduction, as shown by the discontinuous curve II. Otherwise the course of the threshold value corresponds to the one described with reference to FIG. 1c.

In FIG. 1c the ordinate is designated "threshold value". It follows from the description above that this ordinate also might be called "filtering effect". As shown by the course of the curve, any rotational retardations of the wheel caused by axle vibrations, pot holes, etc. and possibly causing erroneous regulation, are filtered out (rendered ineffective) with more or less great sensitivity. This filtering effect (rendering error signals ineffective) is particularly great when the threshold value is greater than the threshold base value $S_G$ or particuarly small when the threshold value is smaller than $S_G$.

The decreasing of the threshold value from the increased threshold value $S_H$ to the low threshold value $S_T$ during the time interval $t_2$ to $t_x$ (FIG. 1c, straight line G) may be selected to have a gradient which is dependent not only on the pressure reduction time interval ($t_1 - t_2$) in the preceeding control cycle, as described above, but additionally also on the vehicle deceleration determined. The threshold value $S_T$ then will be surpassed very quickly on a homogeneous road surface and hereby the "pulsing" of the brake pressure is initiated, as shown by range P in FIG. 1b. Therefore, the brake pressure will approach the maximum pressure more gradually and the undesired "overshooting" of the maximum value is prevented.

A control behavior in accordance with the invention will be described with reference to FIGS. 2 and 3 as occurring in case there is a sudden change of the coefficient of friction on the road surface, for example a sudden change from a wet (slippery) to a dry road surface. This change from a wet road surface which has a bad coefficient of friction to a dry road surface which has a good coefficient of friction is assumed to take place at the location marked by arrow A. During the entire pressure build-up phase in the time interval from $t_2$ to $t_1'$ the wheel does not suffer any rotational retardation beyond the threshold value because of the change of the coefficient of friction of the road surface so that consequently the pressure rise according to FIG. 2b is not interrupted. The brake pressure, therefore, is increased quickly and without delay to the maximum value possible so that no braking effect is given away. In this instance the time interval $t_x$ to $t_y$ during which the low threshold value $S_T$ is effective has been selected to be relatively short.

If the time interval $t_x$ to $t_y$ is chosen to be relatively long, as shown in FIG. 3c, the rotational retardation of the wheel will surpass the more sensitive threshold value at relatively late points in time ($t_5$ etc. in FIG. 3c) so that the "pulsing" mentioned of the brake pressure will take place at the end of the pressure raising phase. In this manner the approach to the maximum value of the brake pressure is gradual, as desired. Two different locking pressures occur because of the assumed jump of the frictional value at A, as shown in FIGS. 2b and 3b. At the lower coefficient of friction of the road surface the lower locking pressure $B_1$ is applicable and at the road surface with the higher coefficient of friction the higher locking pressure $B_2$ is applicable.

FIG. 4 shows a variant as regards the control of the threshold value. As with the examples described, the threshold value is increased to the higher value $S_H$ at time $t_2$. Thereupon the threshold value decays at the gradient G. During this decay of the threshold value the rotational behavior of the wheel is monitored continuously. Assuming that the wheel reaches the normal threshold base value $S_G$ during the decay phase at time $t_2$, this will not initiate any pressure reduction at the brake because of the increased threshold value. In accordance with the variant shown in FIG. 4, however, the threshold value again is increased to the higher value $S_H$ at time $t_2'$. Following that, the threshold value decreases with the gradient G' to the normal threshold base value $S_G$ during the time interval $t_2'$ to $t_y$. It is obvious that, by modifying FIG. 4, the threshold value also may be decreased to lower values (corresponding to $S_T$) in accordance with the embodiments described with reference to FIGS. 1 to 3. As shown in FIG. 4, the gradient G' is steeper following a renewed "triggering" of the increased threshold value $S_H$ than it would be if this renewed triggering were missing. The gradient G' at which the threshold value drops after the renewed triggering is selected to be so steep according to FIG. 4, that the decay time of the threshold value on the whole is not longer than it would be in the event that the threshold base value $S_G$ would not have been reached by the braked wheel during the decay phase.

A speed difference of 8 km/h may be assumed as a typical example of the courses of the threshold value shown in the figures with respect to the increased threshold value $S_H$. This increased threshold value typically may be lowered to the normal threshold base value $S_G$ of, for example, 2 km/h during a decay phase of 50 milliseconds.

FIG. 5 shows a block diagram of an apparatus for carrying out the embodiment described above with which the threshold value is increased by a constant amount $S_H-S_G$ and the subsequent gradient G of the pressure reduction is adjusted in response to the pressure reduction time interval $t_1-t_2$ in the preceeding control cycle (cf. FIG. 1).

If there is a pressure reduction, a down counter is loaded with a value $S_H$ which is counted down during a pressure build-up phase. The counting frequency by which a clock generator clocks the down counter depends on the pressure reduction period in the preceding control cycle. The gradient of the decrease of the threshold value thus is determined by the pressure reduction time interval applied in the preceding control cycle. The pressure is reduced in accordance with the output of comparator 2. If there is a pressure reduction at a time at which the threshold value adjusted is the standard threshold value $S_G$, the down counter is recharged based on the output of gate G1. The threshold value is switched over by switches S1 and S2. The threshold value $S_G$ is adjusted when "1" appears at the output of gate G3 (the counter has counted a maximum permissible number of pressure reductions during a sensitive phase of the threshold value or the time for a pressure reduction during the sensitive phase of the threshold value became longer than a given time interval). In case of a "0"-output of gate G3 switch S1 is blocked and switch S2 is turned on by way of an inverter I so that the decisive threshold value will be the value which is being generated by the down counter at this particular moment.

The number of pressure reductions during the time interval (FIG. 1: $t_x-t_y$) during which a sensitive threshold value $S_T$ is adjusted is determined by the counter. Whenever a new pressure reduction begins and the threshold value being monitored is the regular threshold value $S_G$ (output of comparator 1 being "1") the output of gate G2 will change over from "0" to "1" and the counter will count one step further. The counter balance is erased if a pressure reduction takes place when the adjusted threshold value is threshold value $S_G$ (output of gate G1 being "1").

What is claimed is:

1. A method of controlling brake pressure in an antilock vehicle brake system comprising the steps of:
   (a) applying brake pressure,
   (b) measuring the rotational speed of a braked wheel,
   (c) deriving from the measured rotational speed a rotational deceleration of the braked wheel,
   (d) comparing the rotational deceleration with a threshold value,
   (e) lowering the brake pressure acting in the brake of said braked wheel when the rotational deceleration exceeds the threshold value, and
   (f) applying brake pressure again at a time ($t_2$) later than a time ($t_1$) at which said lowering of brake pressure was performed, characterized by
   (g) increasing the threshold value from a given base value ($S_G$) by a given constant amount ($S_H-S_G$) and at a time which is a function of the time ($t_2$) when the brake pressure is applied again.

2. A method of controlling brake pressure in an antilock vehicle brake system comprising the steps of:
   (a) applying brake pressure,
   (b) measuring the rotational speed of a braked wheel,
   (c) deriving from the measured rotational speed the rotational deceleration of the braked wheel,
   (d) comparing the rotational deceleration with a threshold value,
   (e) lowering the brake pressure acting in the brake of said braked wheel when the rotational deceleration exceeds the threshold value, and
   (f) applying brake pressure again at a time ($t_2$) later than a time ($t_1$) at which said lowering of brake pressure was performed, characterized by
   (g) measuring in a first control cycle a time interval ($t_1-t_2$) in which the brake pressure is reduced, and
   (h) increasing in a second control cycle the threshold value with respect to a base value ($S_G$) by an amount ($S_H-S_G$) which is dependent on said measured time interval ($t_1-t_2$).

3. A method of controlling brake pressure in an antilock vehicle brake system comprising the steps of:
   (a) applying brake pressure,
   (b) measuring the rotational speed of a braked wheel,
   (c) deriving from the measured rotational speed a rotational slip of the braked wheel,
   (d) comparing the rotational slip with a threshold value, (e) lowering the brake pressure acting in the brake of said braked wheel when the rotational slip exceeds the threshold value, and (f) applying brake pressure again at a time ($t_2$) later than a time ($t_1$) at which said lowering of brake pressure was performed, characterized by (g) increasing the threshold value from a given base value ($S_G$) by a given constant amount ($S_H - S_G$) and at a time which is a function of the time ($t_2$) when the brake pressure is applied again.

4. A method of controlling brake pressure in an antilock vehicle brake system comprising the steps of:

(a) applying brake pressure, (b) measuring the rotational speed of a braked wheel, (c) deriving from the measured rotational speed the rotational slip of the braked wheel, (d) comparing the rotational slip with a threshold value, (e) lowering the brake pressure acting in the brake of said braked wheel when the rotational slip exceeds the threshold value, and (f) applying brake pressure again at a time ($t_2$) later than a time ($t_1$) at which said lowering of brake pressure was performed, characterized by (g) measuring in a first control cycle a time interval ($t_1 - t_2$) in which the brake pressure is reduced, and (h) increasing in a second control cycle the threshold value with respect to a base value ($S_G$) by an amount ($S_H - S_G$) which is dependent on said measured time interval ($t_1 - t_2$).

5. The method as claimed in one of claims 1, 2, 3 or 4 wherein after said increase of the threshold value the threshold value is decreased at a gradient which depends on the time interval ($t_2 - t_1$) of the lowering of pressure in at least one of the preceding control cycles.

6. The method as claimed in one of claims 1, 2, 3 or 4 wherein, after increasing the threshold value, the threshold value is decreased at a gradient dependent on a measured vehicle deceleration.

7. The method as claimed in one of claims 1, 2, 3 or 4, wherein after increasing the threshold value, the threshold value is decreased for a given time period ($t_x - t_y$) to a value ($S_T$) which is lower than the threshold base value ($S_G$).

8. The method as claimed in claim 7, wherein following a decrease of the threshold value to a value ($S_T$) which lies below the threshold base value ($S_G$), a brake pressure reducing phase is maintained for a given time period even if the derived rotational deceleration of the braked wheel exceeds the lower threshold value ($S_T$).

9. The method as claimed in one of claims 1, 2, 3 or 4, wherein said increase of the threshold value is performed according to a given time function.

10. A method according to claims 1 or 3, wherein said increase of the threshold value is performed at the time ($t_2$) when the brake pressure is applied again.

11. A method according to claims 2 or 4, wherein said first control cycle directly precedes said second control cycle.

* * * * *